(12) United States Patent
Kosiakova et al.

(10) Patent No.: US 11,423,654 B2
(45) Date of Patent: Aug. 23, 2022

(54) IDENTIFICATION OF CONTINUITY ERRORS IN VIDEO BY AUTOMATICALLY DETECTING VISUAL INCONSISTENCIES IN VIDEO FRAMES

(71) Applicant: ADOBE INC., San Jose, CA (US)

(72) Inventors: Tatiana Kosiakova, Hamburg (DE); Nils Meder, Hamburg (DE)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/589,954

(22) Filed: Oct. 1, 2019

(65) Prior Publication Data
US 2021/0097291 A1 Apr. 1, 2021

(51) Int. Cl.
*G06K 9/46* (2006.01)
*G06V 20/40* (2022.01)
*G06T 7/11* (2017.01)
*G06N 3/08* (2006.01)

(52) U.S. Cl.
CPC ............... *G06V 20/46* (2022.01); *G06N 3/08* (2013.01); *G06T 7/11* (2017.01); *G06V 20/41* (2022.01); *G06T 2207/10016* (2013.01); *G06T 2207/20081* (2013.01)

(58) Field of Classification Search
CPC .. G06K 9/00718; G06K 9/00744; G06N 3/08; G06T 2207/10016; G06T 2207/20081; G06T 7/11
See application file for complete search history.

(56) References Cited

U.S. PATENT DOCUMENTS

2013/0128062 A1\* 5/2013 Jin .......................... G06T 7/246
348/208.4
2018/0137892 A1\* 5/2018 Ding ..................... G06K 9/3241

\* cited by examiner

*Primary Examiner* — Xin Jia
(74) *Attorney, Agent, or Firm* — Shook, Hardy & Bacon LLP

(57) ABSTRACT

Embodiments of the present invention are directed towards determining visual inconsistencies in frames of a video to identify continuity errors in the video. A visual inconsistency can be based on an appearance or a disappearance of an object between frames of the video. Visual inconsistencies in the video can also be identified based on a semantic analysis of an object corresponding to a frame of the video. Identified continuity errors can be used to generate an error report.

20 Claims, 12 Drawing Sheets

IDENTIFICATION OF CONTINUITY ERRORS IN VIDEO BY AUTOMATICALLY DETECTING VISUAL INCONSISTENCIES IN VIDEO FRAMES

BACKGROUND

Users often desire that created content is visually consistent. In particular, when creating videos, users desire that transitions between various camera views in a scene maintain the realism (e.g., content) of the video. For instance, when switching from one view in a scene to another, a character should have the same clothing and objects in the scene (e.g., cup on a table). Further, when creating videos, users expect that out of place objects should not be included in scenes. For example, in a video set in medieval times, there should not be cars. Accordingly, scenes of a video can be analyzed to determine if there are any visual inconsistencies.

Conventional methods for analyzing videos to identify visual inconsistencies have had limited success. In particular, conventional methods have relied on manual analysis of video to identify visual inconsistencies. However, the huge amount of film material and scenes that make up an average video makes it nearly impossible for humans to manually spot every error in a video. As such, conventional methods are not capable of easily identifying visual inconsistencies in video.

SUMMARY

Embodiments of the present disclosure are directed towards determining visual inconsistencies in frames of a video to identify continuity errors in the video. A visual inconsistency can be based on an appearance or a disappearance of an object between frames in the video. Visual inconsistencies in a video can also be identified based on the semantics of the video or a scene in the video. Identified continuity errors can be used to generate an error report that highlights a continuity error using a colored bounding box around an object corresponding to the determined visual inconsistency.

To identify any continuity errors in a video, one or more video frames in the video can be analyzed to determine the presence of any visual inconsistencies. In one embodiment, continuity errors can be based on determined visual inconsistencies between video clips that make up a scene of the video. In particular, frames of the scene can be analyzed to identify main objects and associated features. The main objects and features of frames can be compared to determine if there is an appearance or a disappearance of an object between the frames. Any appearance or disappearance can be determined as a visual inconsistency. Such visual inconsistencies can be identified as continuity errors in the video. In another embodiment, continuity errors can be based on visual inconsistencies from semantics of the video or a scene in the video (e.g., a modern car is visually inconsistent in a Western movie). In particular, semantics of the video or a scene in the video can be identified. Based on the semantics, objects can be analyzed to determine whether they belong in the video or the scene. A visual inconsistency can be determined when an object does not fit with the semantics of the video or the scene. Any determined visual inconsistencies can be identified as continuity errors in the video.

DETAILED DESCRIPTION

Figure 1A:
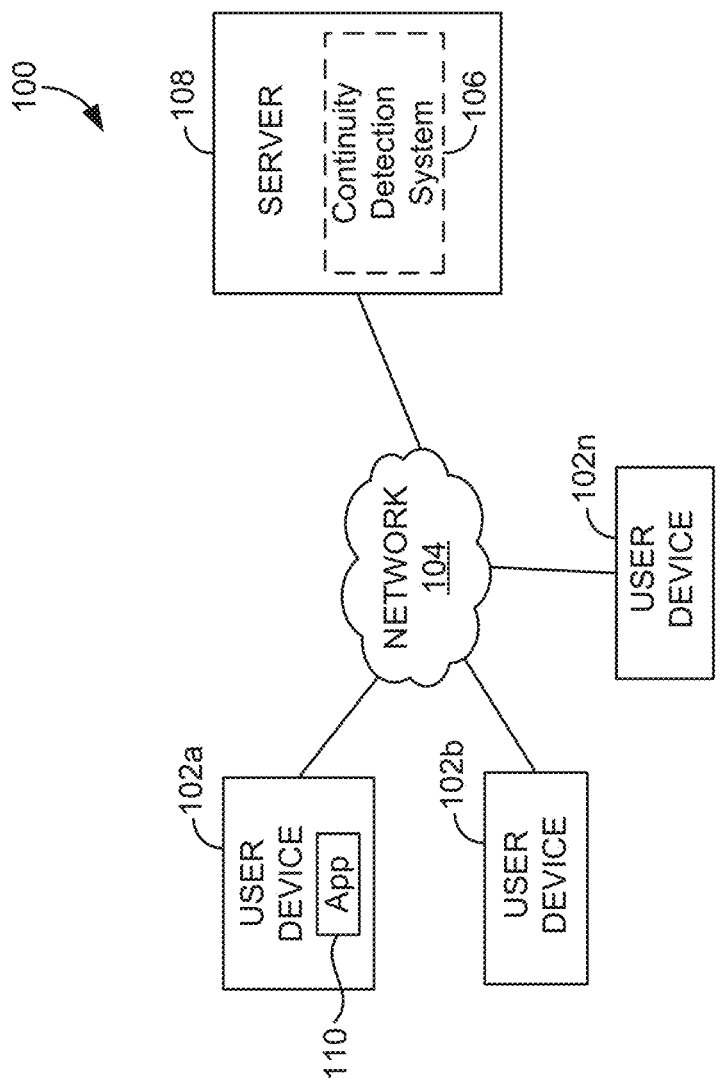
FIG. 1A depicts an example configuration of an operating environment in which some implementations of the present disclosure can be employed, in accordance with various embodiments.

The subject matter of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Oftentimes, users desire that videos they create do not contain visual inconsistencies that ruin viewer engagement with the videos. For example, a visual inconsistency of a main character suddenly wearing a new shirt half-way through a scene can distract a viewer from the storyline of a video. As another example, a visual inconsistency of a coffee cup appearing in a scene set in medieval times can distract a viewer. Conventional methods for identifying visual inconsistencies rely on the manual review of videos. Such manual methods of identifying visual inconsistencies in videos are burdensome and require a user to spend a large amount of time and a high level of energy to detect inconsistencies. For instance, a two-hour video can be comprised of many scenes, each having hundreds of thousands of frames. As such, many inconsistencies are often missed when using such conventional review processes. In this way, conventional review methods can result in low-quality videos that contain distracting visual inconsistencies. Additionally, such manual methods are typically performed late in the production process. Thus, conventional review methods can result in high monetary costs to correct any identified mistakes.

Accordingly, embodiments of the present disclosure present a solution for improving video processing to create higher-quality videos by quickly and efficiently identifying continuity errors in video. In particular, scenes of a video can be analyzed to determine visual inconsistencies that indicate continuity errors in the video. Identified continuity errors can be compiled to generate an error report that indicates any visual inconsistency determined in the video. Analyzing scenes in a video for visual inconsistencies based on objects in a frame can identify a statistically significant amount of continuity errors present in the video. Advantageously, determining continuity errors in a video allows for the production of higher-quality videos. In particular, determining continuity errors significantly improves the quality of videos because identifying distracting visual inconsistencies allows for the removal of the visual inconsistencies.

Further, determining visual inconsistencies to identify continuity errors solves a longstanding problem in post-production video processing by making the production process more efficient. In particular, it is advantageous that such continuity errors can be identified much earlier in the production process. For example, continuity errors in the video can be identified as scenes are imported into an editing program (e.g., a post-production video processing program). Such early identification provides the tangible benefit of making the post-production process more efficient, which results in significantly lower costs associated with correcting the visual inconsistencies of identified continuity errors in a video.

The manner in which some embodiments of the present disclosure analyze scenes of a video to determine visual inconsistencies focus on analyzing main objects in a scene. Such analysis is performed in a manner that balances the use of computational resources with analyzing the overwhelming amount of data that comprises a video (e.g., hundreds of thousands of frames). In particular, focusing on portions of interest in a frame of a scene for a more detailed review to detect inconsistencies is more computationally efficient than performing a detailed review of the entire frame. Advantageously, identifying a smaller area of the frame associated with the main object can allow for a more detailed analysis of associated features while utilizing less computational resources. In this way, the present disclosure identifies main objects in a scene and then performs a more detailed review of areas associated with the main objects to identify visual inconsistencies.

At a high level, some implementations of the technology described herein can automatically analyze a video to determine continuity errors in the video. Such a video can be comprised of a number of scenes. Each scene, in turn, can be made up of various video clips. These video clips can be of the same scene filmed using different camera shots (e.g., from different angles and/or viewpoints). For example, in a scene of a man sitting at a desk, one video clip can be a distance shot (e.g., showing the whole room with the man and desk in a corner of the room), another video clip can be a closer shot (e.g., showing just the man and desk), a further clip can be a close-up shot (e.g., just the man's face), and a final clip can be shot with a different viewpoint (e.g., showing the room from the perspective of the man behind the desk). These video clips can be comprised of a number of video frames (e.g., based on a number of frames per second in the video).

To identify any continuity errors in a video, one or more video frames in the video (e.g., from one or more video clips of the video) can be analyzed to determine the presence of any visual inconsistencies. Continuity errors can include any visual inconsistency in a video. For instance, a visual inconsistency in a scene of a video can be between video clips that make up the scene. A visual inconsistency can be based on an appearance or a disappearance of an object between the video clips that make up the scene. As an example, a visual inconsistency can occur when, in a first video clip of a scene, a main character is wearing a blue plaid shirt and in a second video clip of the scene, the main character is wearing a red plaid shirt. Visual inconsistencies in a video can also be identified based on the semantics of the video or a scene in the video. Such visual inconsistencies based on semantics can occur when an object does not fit within the context, genre, meaning, and/or time-period of the video or a scene in the video. For example, in a video set in medieval time, it is semantically inconsistent if there is a car in a scene. Identified continuity errors can be used to generate an error report. An error report can be any indication, presentation, or output of determined visual inconsistencies identified as continuity errors in the video.

In more detail, continuity errors can be identified by analyzing scenes in a video. In one embodiment, continuity errors can be based on determined visual inconsistencies between video clips that make up a scene of the video. In particular, the scene can be analyzed to identify transitions from video clip to video clip in the scene. Upon identifying transition in the scene, frames bordering the transition can be selected (e.g., one or more frames from each video clip). For instance, a first frame from a first video clip (e.g., the video clip being exited in the transition) can be selected along with a second frame from a second video clip (e.g., the video clip being entered in the transition). The selected frames can then be analyzed to identify main objects in the frames (e.g., car, main character, etc.). Features can then be identified for these main objects (e.g., color of car, color of shirt for main character, etc.). The main objects and features of the frames can be compared to determine any visual inconsistencies for the scene. In particular, the main objects and features of the frames can be compared to determine if there is an appearance or a disappearance of an object (e.g., main object and/or feature) between the frames. Any determined visual inconsistencies can be identified as continuity errors in the video.

In another embodiment, continuity errors can be based on visual inconsistencies from semantics of the video or a scene in the video (e.g., based on genre of the video). In particular, semantics of the video or a scene in the video can be identified (e.g., by a user). Based on the semantics, the video or the scene in the video can be analyzed. For instance, main objects and features of the main objects can be identified in the video or the scene. These identified objects can then be analyzed based on the semantics of the scene. Visual inconsistencies can be determined when a main object and/or feature does not fit with the semantics of the video or the scene. Any determined visual inconsistencies can be identified as continuity errors in the video. As an example, a car identified in a scene with medieval semantics can be flagged as a continuity error. As another example, a STARBUCKS coffee cup identified in a scene with medieval fantasy semantics can be flagged as a continuity error.

Any identified continuity errors can be used to generate an error report. The error report can be any indication, presentation, or output indicative of the identified continuity errors. An error report can present identified continuity errors in a variety of manners. For instance, continuity errors can be presented in list form (e.g. identifying main objects and/or associated features that cause the error). As another example, continuity errors can be presented by highlighting continuity of the main objects and/or associated features in a scene (e.g., objects and/or features that are continuously highlighted using a green bounding box and objects and/or features that are not continuously highlighted using a red bounding box). In some embodiments, the error report can also include predicted probabilities of the main objects and/or associated features. Such predicted probabilities can indicate the likelihood that the main objects and/or associated features is correctly identified. For example, if a bicycle is identified in a frame, a predicted probability can indicate a likelihood that the bicycle was accurately identified (e.g., 87%). In this aspect, the user can review the error report to determine how to proceed regarding identified continuity errors. For instance, upon identifying a continuity error in a video, various methods can be employed to correct the error. Such methods include automatically cutting out an identified object (e.g., removing a coffee cup from frames of a scene), refilming a scene, manually cutting out an identified object, etc.

FIG. 1A depicts an example configuration of an operating environment in which some implementations of the present disclosure can be employed, in accordance with various embodiments. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 11.

It should be understood that operating environment 100 shown in FIG. 1A is an example of one suitable operating environment. Among other components not shown, operating environment 100 includes a number of user devices, such as user devices 102a and 102b through 102n, network 104, and server(s) 108. Each of the components shown in FIG. 1A may be implemented via any type of computing device, such as one or more of computing device 1100 described in connection to FIG. 11, for example. These components may communicate with each other via network 104, which may be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 104 is not described in significant detail.

It should be understood that any number of user devices, servers, and other components may be employed within operating environment 100 within the scope of the present disclosure. Each may comprise a single device or multiple devices cooperating in a distributed environment.

User devices 102a through 102n can be any type of computing device capable of being operated by a user. For example, in some implementations, user devices 102a through 102n are the type of computing device described in relation to FIG. 11. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user devices can include one or more processors, and one or more computer-readable media. The computer-readable media may include computer-readable instructions executable by the one or more processors. The instructions may be embodied by one or more applications, such as application 110 shown in FIG. 1A. Application 110 is referred to as a single application for simplicity, but its functionality can be embodied by one or more applications in practice. As indicated above, the other user devices can include one or more applications similar to application 110. As an example, application 110 can be any one of ADOBE PREMIERE PRO CC, ADOBE PREMIERE ELEMENTS, and/or ADOBE AFTER EFFECTS.

The application 110 may generally be any application capable of facilitating the exchange of information between the user devices and the server(s) 108 in identifying continuity errors in a video by determining visual inconsistencies in frames of the video. In some implementations, the application 110 comprises a web application, which can run in a web browser, and could be hosted at least partially on the server-side of environment 100. In addition, or instead, the application 110 can comprise a dedicated application, such as an application having image processing functionality. In some cases, the application 110 is integrated into the operating system (e.g., as a service). It is therefore contemplated herein that "application" be interpreted broadly.

In accordance with embodiments herein, the application 110 facilitates identifying continuity errors in a video by determining visual inconsistencies in frames of the video. In embodiments, a video is received that has one or more scenes. Each scene can be made up of various video clips of the scene filmed using different camera shots (e.g., different angles and/or viewpoints) The video can be selected from a repository, for example, a repository stored in a data store accessible by a network or stored locally at the user device (e.g., user device 102a). Based on the selected video, (e.g., provided via a user device or server), main objects and associated features can be identified in frames of the video. From the identified main objects and associated features in the frames of the video, visual inconsistencies can be determined. This may include comparing identified main objects and associated features in a first frame with identified main objects and associated features in a second frame to determine visual inconstancies (e.g., continuity differences) between the two scenes. This may also include comparing identified main objects and associated features in a frame with semantics of the video and or scene to identify errors (e.g., a cell phone or car in a medieval film). These determined visual inconstancies can identify continuity errors in the video. The identified errors based on determined visual inconstancies can be output to a user, for example, to the user via the user device 102a. In particular, such identified errors can be output as an error report. In this regard, the error report can be displayed via a display screen of the user device.

As described herein, server 108 can facilitate identifying continuity errors in a video by determining visual inconsistencies in frames of the video via continuity detection system 106. Server 108 includes one or more processors, and one or more computer-readable media. The computer-readable media includes computer-readable instructions executable by the one or more processors. The instructions may optionally implement one or more components of continuity detection system 106, described in additional detail below.

For cloud-based implementations, the instructions on server 108 may implement one or more components of continuity detection system 106, and application 110 may be utilized by a user to interface with the functionality implemented on server(s) 108. In some cases, application 110 comprises a web browser. In other cases, server 108 may not be required, as further discussed with reference to FIG. 1B. For example, the components of continuity detection system 106 may be implemented completely on a user device, such as user device 102a. In this case, continuity detection system 106 may be embodied at least partially by the instructions corresponding to application 110.

Figure 1B:
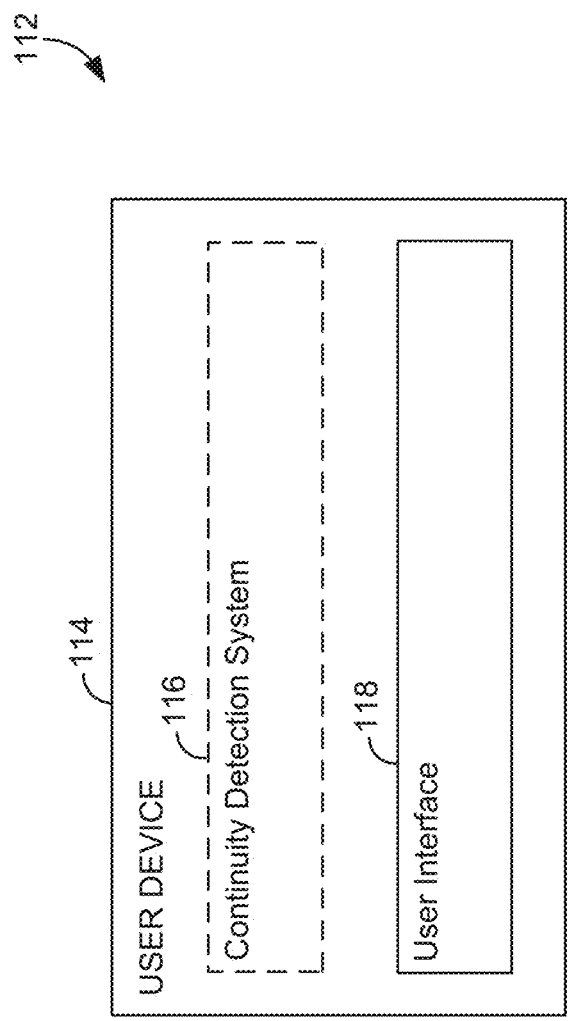
FIG. 1B depicts another example configuration of an operating environment in which some implementations of the present disclosure can be employed, in accordance with various embodiments.

Referring to FIG. 1B, aspects of an illustrative continuity detection system are shown, in accordance with various embodiments of the present disclosure. FIG. 1B depicts a user device 114, in accordance with an example embodiment, configured to allow for identifying continuity errors in a video by determining visual inconsistencies in frames of the video using a continuity detection system 116. The user device 114 may be the same or similar to the user device 102a-102n and may be configured to support the continuity detection system 116 (as a standalone or networked device). For example, the user device 114 may store and execute software/instructions to facilitate interactions between a user and the continuity detection system 116 via the user interface 118 of the user device.

Figure 2:
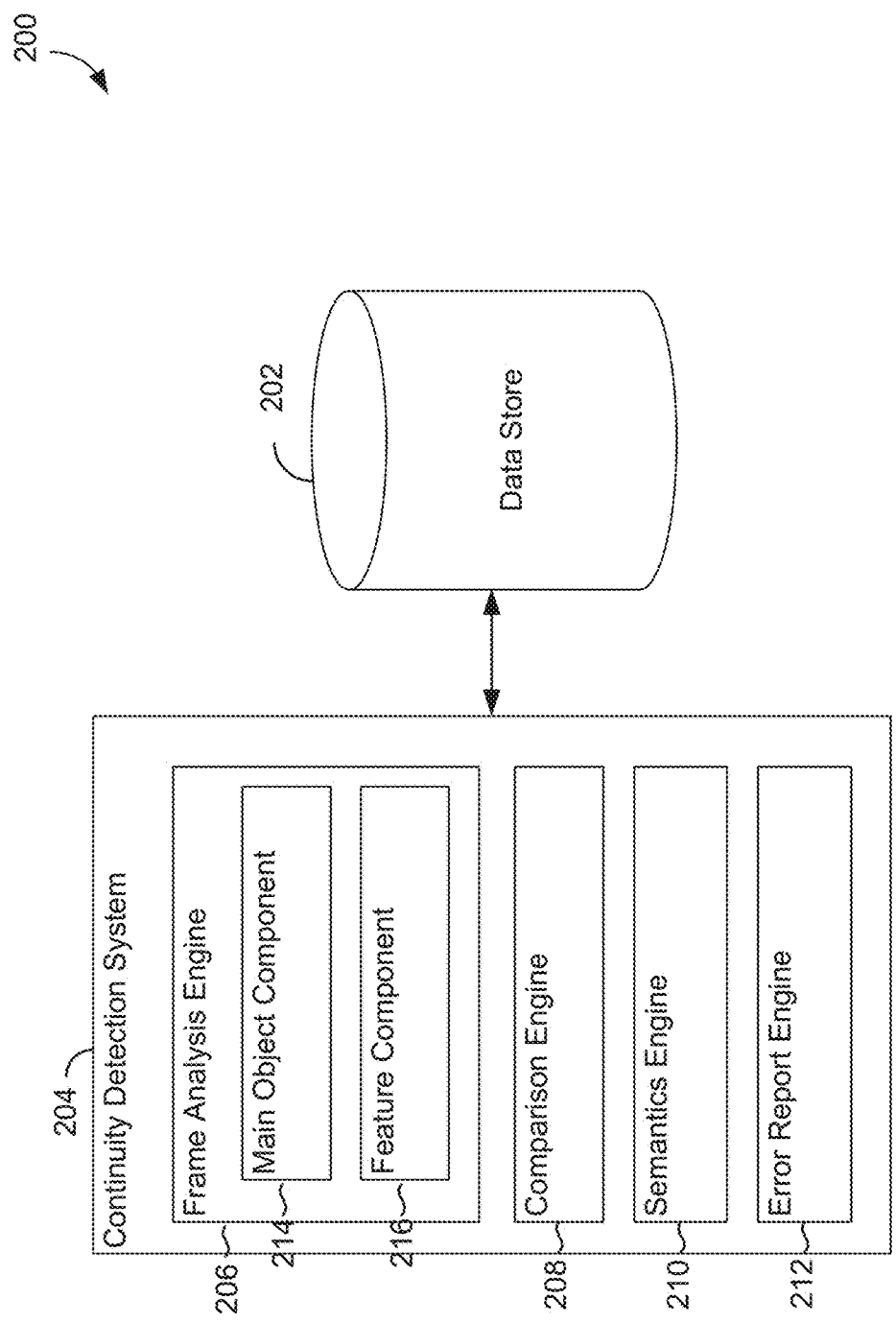
FIG. 2 depicts a further example configuration of an operating environment in which some implementations of the present disclosure can be employed, in accordance with various embodiments of the present disclosure.

FIG. 2 depicts another example configuration of an operating environment in which some implementations of the present disclosure can be employed, in accordance with various embodiments of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 11. It should be understood that operating environment 200 shown in FIG. 2 is an example of one suitable operating environment. Among other components not shown, operating environment 200 includes a number of user devices, networks, and server(s).

Continuity detection system 204 includes frame analysis engine 206, comparison engine 208, semantics engine 210, and error report engine 212. The foregoing engines of continuity detection system 204 can be implemented, for example, in operating environment 100 of FIG. 1A and/or operating environment 112 of FIG. 1B. In particular, those engines may be integrated into any suitable combination of user devices 102a and 102b through 102n and server(s) 108 and/or user device 114. While the various engines are depicted as separate engines, it should be appreciated that a single engine can perform the functionality of all engines. Additionally, in implementations, the functionality of the engines can be performed using additional engines and/or components. Further, it should be appreciated that the functionality of the engines can be provided by a system separate from the continuity detection system.

As shown, continuity detection system 204 may operate in conjunction with data store 202. Data store 202 can store computer instructions (e.g., software program instructions, routines, or services), data, and/or models used in embodiments described herein. In some implementations, data store 202 can store information or data received via the various engines and/or components of continuity detection system 204 and provide the engines and/or components with access to that information or data, as needed. Although depicted as a single component, data store 202 may be embodied as one or more data stores. Further, the information in data store 202 may be distributed in any suitable manner across one or more data stores for storage (which may be hosted externally).

In embodiments, data stored in data store 202 may include videos, objects associated with various video semantics, visual inconstancies identified in videos, identified continuity errors for videos, and generated error reports. In some cases, data store 202 receives data from user devices (e.g., a video received by user device 102a or another device associated with a user, via, for example, application 110). In other cases, data is received from one or more data stores in the cloud.

A video is received for continuity error analysis by continuity detection system 204. The video may be received, for instance, from a user at a user device. The user may select or input video in any available manner. For example, a user may film a video using a camera on a device, for example, user device 102*a*-102*n* and/or user device 114 of FIGS. 1A-1B. As another example, a user may select a video from a repository stored in a data store accessible by a network or stored locally at the user device 102*a*-102*n* and/or user device 114 of FIG. 1A-1B. In other embodiments, a user can input the video by inputting a link or URL to a video. Such a video can have one or more scenes. Further, each scene can be made up of various video clips of the scene filmed using different camera shots (e.g., different angles and/or viewpoints).

The continuity detection system 204 can analyze the video to identify any visual inconsistencies that indicate continuity errors. Such analysis is performed in a manner that balances the use of computational resources with analyzing the overwhelming amount of data that comprises a video (e.g., hundreds of thousands of frames) to identify any visual inconsistencies. In particular, portions of interest in frames of a scene can undergo a more detailed review instead of performing a detailed review of an entire frame. Advantageously, identifying a smaller area of a frame associated with the main object can allow for a more detailed analysis of features likely to cause visual inconsistencies between frames while utilizing less computational resources.

Frame analysis engine 206 analyzes a video. In particular, the frame analysis engine 206 can be used to analyze frames of a video to identify main objects and/or features in a frame. As depicted, frame analysis engine 206 includes main object component 214 and feature component 216. The foregoing components of frame analysis engine 206 can be implemented, for example, in operating environment 100 of FIG. 1A and/or operating environment 112 of FIG. 1B. In particular, those components may be integrated into any suitable combination of user devices 102*a* and 102*b* through 102*n* and server(s) 108 and/or user device 114. While the various components are depicted as separate components, it should be appreciated that a single component can perform the functionality of all components. Additionally, in implementations, the functionality of the components can be performed using additional components and/or engines. Further, it should be appreciated that the functionality of the components can be provided by an engine separate from the frame analysis engine.

Main object component 214 identifies main objects in the video. In particular, the main object component can identify a main object in a frame of the video. A main object can comprise an area of a frame that contains meaningful content and/or contains subject matter of the frame. Meaningful content can be designated as content in a video frame of interest to a user. For example, meaningful content can be the main person and/or object in the video frame. A main object can be determined using various methods. For instance, in some implementations, main object component 214 can identify a main object (e.g., one or more main objects) in a frame based on an object selected by a user. In other implementations, the main object component can identify a main object in a frame based on automatic identification using known real-time object detection technologies (e.g., YOLO or SDD). In embodiments, identified main objects can have associated prediction confidence levels (e.g., indicating probability of correct identification). The appearance time of objects frame-to-frame in a scene can also be used to distinguish main objects from background objects. Specific methods for determining main objects are discussed further with reference to FIGS. 3 and 4.

Feature component 216 identifies features in the video. In particular, the feature component can identify features associated with a main object in a frame of the video. Features can comprise objects, aspects, and/or characteristics associated with the main object. For example, features can be colors, materials, and/or object associated with a main object. Features can be determined using various methods. For instance, in some implementations, feature component 216 can identify a feature (e.g., one or more features associated with a main object) in a frame based on a feature selected by a user. In other implementations, the feature component can identify a feature in a frame based on automatic identification using feature detection technologies (e.g., one or more trained CNNs). For instance, a set of trained deep learning image recognition algorithms (e.g., CNNs) can be used to detect features. In embodiments, identified features can have associated prediction confidence levels (e.g., indicating probability of correct identification). Specific methods for determining features are discussed further with reference to FIGS. 3 and 4.

In some embodiments, frame analysis engine 206 can generate feature representations for the video. In particular, the frame analysis engine can compile identified main object(s) (e.g., identified using main object component 214) and associated features (e.g., identified using feature component 216) into a feature representation for a frame. Such a feature representation can be in the form of a feature tree. A feature tree can indicate the hierarchical relationship between a main object and associated features. As an example, one feature tree can be for character one (e.g., main object) with associated features: red plaid shirt, water bottle, and glasses. Further hierarchical levels can be used as well; for instance, the feature water bottle can have a further feature: green label.

Comparison engine 208 compares feature representations of scenes in the video to determined visual inconsistencies that indicate continuity error(s). In particular, comparison engine 208 can identify related video clips in the video (e.g., video clips comprising a scene) and then compare the feature representations associated with the related video clips of the scene to identify any continuity errors. In some embodiments, related video clips can be identified by analyzing video properties. Such video properties can include, for example, timestamp, camera metadata, audio, and tone curves. The feature representations that can be compared by comparison engine 208 can be feature trees, as previously discussed. Specific methods for comparing feature representations of scenes are discussed further with reference to FIGS. 3 and 4.

Semantics engine 210 can analyze a scene based on semantics to determine visual inconsistencies that indicate continuity error(s). In particular, semantics engine 210 can analyze feature representations associated with a scene to identify any continuity errors. The feature representations that can be compared by comparison engine 208 can be feature trees, as previously discussed. Specific methods for analyzing a scene based on semantics are discussed further with reference to FIGS. 3 and 5.

Error report engine 212 can generate an error report for a video. In particular, the error report engine 212 can present identified continuity errors (e.g., based on identified visual inconsistencies). The error report can present identified continuity errors in a variety of manners. For instance, continuity errors can be presented in list form (e.g. identifying main objects and/or associated features that cause the error). As another example, continuity errors can be presented by highlighting continuity of the main objects and/or associated features in a scene (e.g., objects and/or features that are continuous highlighted using a green bounding box and objects and/or features that are not continuous highlighted using a red bounding box). In some embodiments, the error report can also include predicted probabilities of the main objects and/or associated features. Such predicted probabilities can indicate the likelihood that the main objects and/or associated features is correctly identified. For example, if a bicycle is identified in a frame, a predicted probability can indicate a likelihood that the bicycle was accurate identified (e.g., 87%). In this aspect, the user can review the error report to determine how to proceed regarding identified continuity errors. For instance, upon identifying a continuity error in a video, various methods can be employed to correct the error. Such methods include automatically cutting out an identified object (e.g., removing a coffee cup from frames of a scene), refilming a scene, manually cutting out an identified object, etc.

Figure 3:
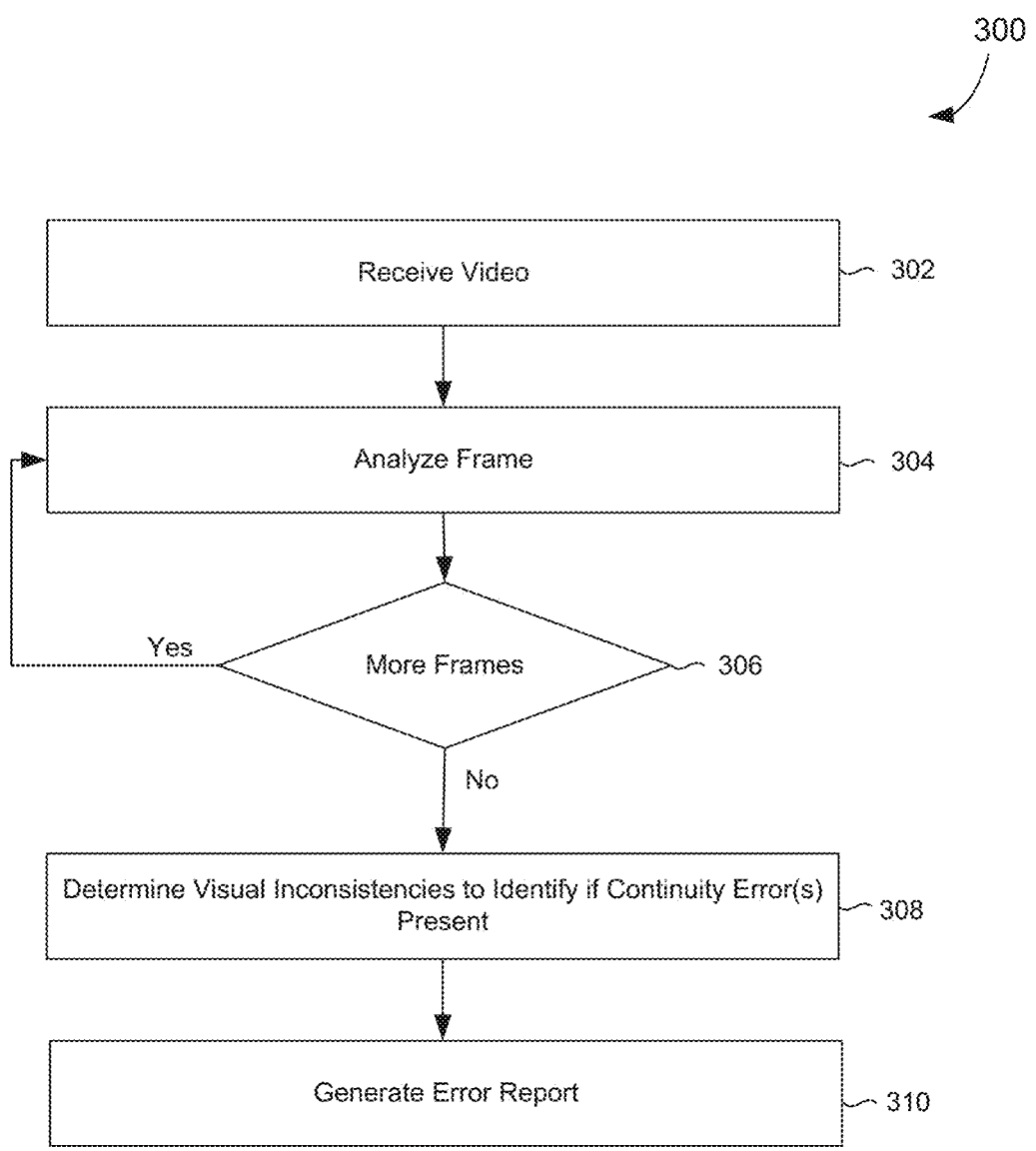
FIG. 3 depicts a process flow showing an embodiment of generating an error report that indicates any continuity errors present in a video, in accordance with various embodiments of the present disclosure.

Turning now to FIG. 3, a process flow is provided showing a method 300 depicting an example of generating an error report that indicates any continuity errors present in a video, in accordance with various embodiments of the present disclosure. Process flow 300 can be carried out, for example by a continuity detection system as discussed with reference to FIGS. 1A, 1B, and 2.

As depicted, process flow 300 begins at block 302 where a video is received. Such a video can be received from, for example, data store 202 of FIG. 2 and/or from a database stored in the cloud. The video can be comprised of N frames. A video frame is one of the many still images that comprise the complete moving picture of the video. The video plays by moving from one frame to another. The video can have one or more scenes. Each scene can be made up of various video clips of the scene filmed, for example, using different camera shots (e.g., different angles and/or viewpoints)

At block 304, a frame of the video can be analyzed. Analyzing the frame can include identifying main objects in the frame. A main object can comprise an area of a frame that contains meaningful content and/or contains subject matter of the frame. Meaningful content can be designated as content in a video frame of interest to a user. For example, meaningful content can be the main person and/or object in the video frame. A main object can be determined using various methods. For instance, a main object (e.g., one or more main objects) can be identified in a frame based on an object selected by a user. In other implementations, a main object in a frame can be identified based on automatic identification using known real-time object detection technologies (e.g., YOLO or SDD). In embodiments, identified main objects can have associated prediction confidence levels (e.g., indicating probability of correct identification). Further, the appearance time of an object can be analyzed frame-to-frame to determine that an object is a main object as opposed to a background object.

Analyzing the frame can further include identifying features associated with a main object in the frame. A more detailed review of the frame can be performed for the area associated with the main object instead of performing a detailed review of an entire frame. Identifying a smaller area of the frame can allow for a more detailed analysis of features likely to cause visual inconsistencies between frames while utilizing less computational resources. Features can comprise objects, aspects, and/or characteristics associated with the main object. For example, features can be colors, materials, and/or object associated with a main object. In some embodiments, features (e.g., one or more features associated with a main object) in a frame based on a feature selected by a user. In other implementations, features can be identified in a frame based on automatic identification using feature detection technologies (e.g., one or more trained CNNs). For instance, a set of trained deep learning image recognition algorithms (e.g., CNNs) can be used to detect features. In embodiments, identified features can have associated prediction confidence levels (e.g., indicating probability of correct identification).

As an example of frame analysis for determining main objects and associated feature, in a scene in a video of a person walking down a busy road, the main object in a frame can be the person and background objects can be passing cars. Features associated with the person can include clothing the person is wearing, if the person is holding anything, items associated with the person, etc. If there are two people walking down the busy road, the first person can be a main object and the second person can be another main object. In such a case when there are multiple main objects in a frame, both main objects can be analyzed for associated features.

In analyzing the frame, upon identifying main objects and associated features, a feature representation of the frame can be compiled. Such a feature representation can be in the form of a feature tree. A feature tree can indicate the hierarchical relationship between a main object and associated features. Continuing with the above example, a first feature tree can be for the first person (e.g., first main object) with associated features: red plaid shirt, baseball hat, and glasses and a second feature tree can be for the second person (e.g., second main object) with associated features: brown jacket and white shoes.

At block 306, a determination can be made whether other frames should be analyzed. In particular, when analyzing for continuity errors in a scene based on visual inconsistency between video clips that make up a scene, frames bordering transitions in the scene can be analyzed. For instance, a first frame from a first video clip (e.g., the video clip being exited in the transition) can be selected along with a second frame from a second video clip (e.g., the video clip being entered in the transition). In some instances, three frames from the first video clip and three frames second video clip can be analyzed. When analyzing for continuity errors based on visual inconsistencies from semantics of the video or a scene in the video, the entire video or the scene can be analyzed. In some instances, to save on computational resources, select frames from the entire video or scene can be analyzed (e.g., every tenth frame, ten frames per minute of film, etc.). Such select frames can be indicated, for example, by a user.

At block 308, a determination can be made whether continuity errors are present. In particular, any visual inconsistencies can be determined using the analyzed frames (e.g., based on feature representations). Determining the presence of continuity errors in a video allows for the production of higher-quality videos. In particular, determining continuity errors significantly improves the quality of videos because identifying distracting visual inconsistencies allows for the removal of the visual inconsistencies. For instance, a visual inconsistency in a scene of a video can be between video clips that make up the scene. As an example, in a first video clip of a scene, a main character is wearing a blue plaid shirt and in a second video clip of the scene, the main character is wearing a red plaid shirt. Such a visual inconsistency can be determined by comparing a first feature representation from the first video clip of the scene (e.g., main character: blue plaid shirt) to a second feature representation from the second video clip of the scene (e.g., main character: red plaid shirt). Based on this comparison, a visual inconsistency between the main character in the first video clip of the scene and the second video clip of the scene can be determined. For instance, this comparison can be used to determine a feature weight indicating deviation between the feature representations. This feature weight can be determined using a variety of factors such as, for example size and distance to the main object. Based on the determination that there is a visual inconsistency, a continuity error can be identified.

Visual inconsistencies in a video can also be based on the semantics of the video or a scene in the video. For example, in a video set in medieval time, it is semantically inconsistent if there is a car in a scene. Such a visual inconsistency can be determined by analyzing one or more feature representations of a scene based on the semantics of the scene. In such an example, a frame of the scene can have a feature representation of main objects: first character, second character, horse, and car. Each of these main objects can be analyzed to determine semantic consistency with the scene. For instance, a trained model can be used to perform such an analysis. In particular, the trained model can be a dynamic learning model based on the semantics. Such a model can be a cloud-based model that can be updated using identified errors in detection (e.g., based on incorrectly flagged semantic continuity errors).

At block 310, an error report can be generated that indicates any continuity errors (e.g., based on visual inconsistencies) identified in the video. The error report can present identified continuity errors in a variety of manners. For instance, continuity errors can be presented in list form (e.g. identifying main objects and/or associated features that cause the error). As another example, continuity errors can be presented by highlighting continuity of the main objects and/or associated features in a scene (e.g., objects and/or features that are continuous highlighted using a green bounding box and objects and/or features that are not continuous highlighted using a red bounding box). In some embodiments, the error report can also include predicted probabilities of the main objects and/or associated features. Such predicted probabilities can indicate the likelihood that the main objects and/or associated features is correctly identified. For example, if a bicycle is identified in a frame, a predicted probability can indicate a likelihood that the bicycle was accurate identified (e.g., 87%).

Figure 4:
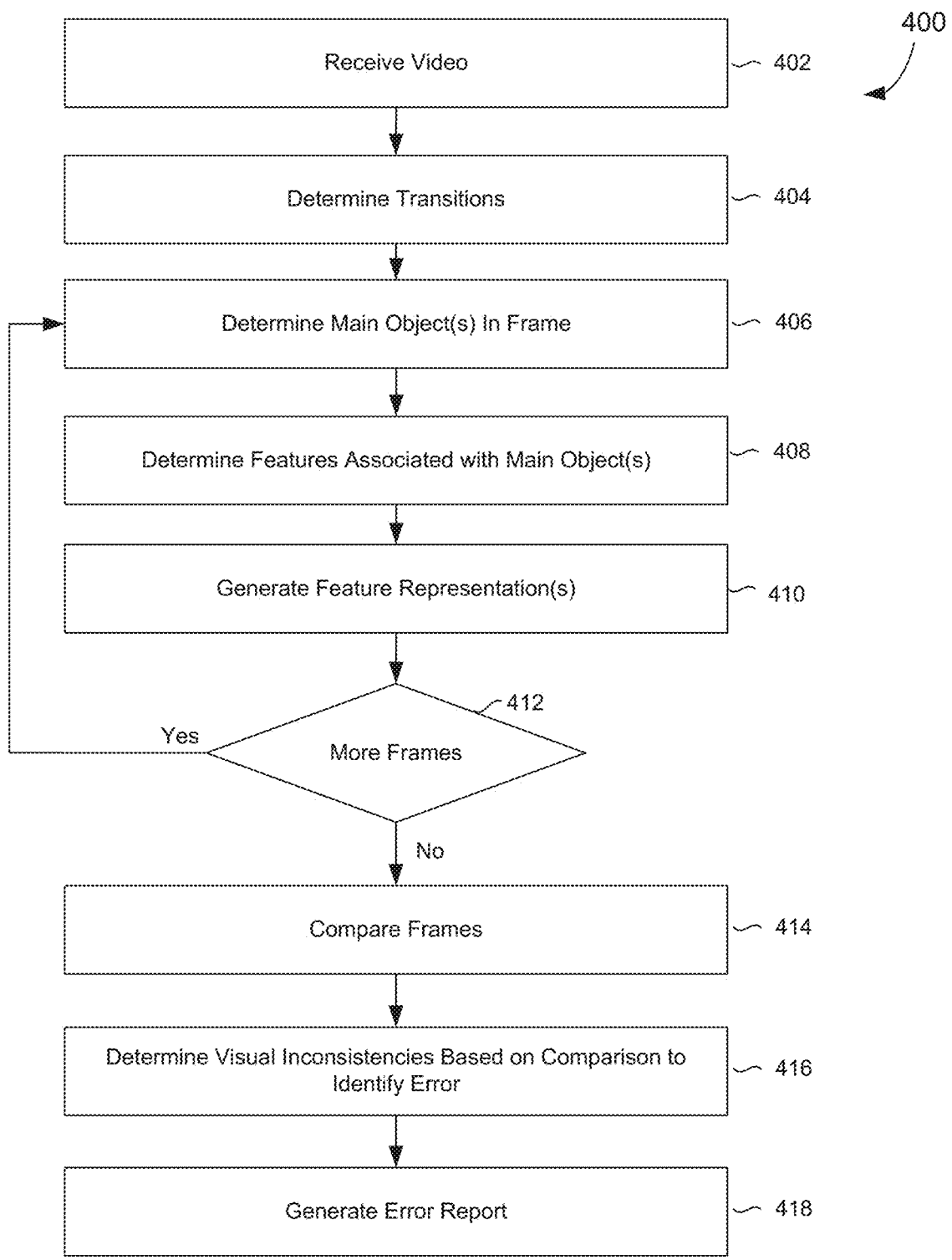
FIG. 4 depicts a process flow showing an embodiment of generating an error report indicating continuity errors based on identified visual inconsistencies between video clips that make up a scene in a video, in accordance with various embodiments of the present disclosure.

FIG. 4 provides a process flow showing an embodiment of method 400 depicting an example of generating an error report indicating continuity errors based on identified visual inconsistencies between video clips that make up a scene in a video, in accordance with various embodiments of the present disclosure. Such a method can be performed, for instance, using the frame analysis engine 206 in conjunction with comparison engine 208 of continuity detection system 204 as described with reference to FIG. 2.

At block 402, a video is received. Such a video can be received from, for example, a data store and/or from a database stored in the cloud. The video can be comprised of N frames. At least one transition in the video can be determined at block 404. Such transitions can be a transition from one scene to another scene or a transition from one video clip to another video clip in the same scene. From such transitions, in some embodiments, a scene for analysis can be identified. For instance, a scene comprised of one or more video clips can be identified for analysis. In other embodiments, all or a predefined set (e.g., every 5 frames) of the frames of the video can be identified for analysis.

At block 406, a main object(s) in a frame can be determined. A main object can be determined based on a region of interest in the frame. For example, a region of interest can comprise an area of a frame that contains meaningful content and/or contains the subject matter of the frame. A region of interest can be designated as content that draws a user's eye to the video frame. A region of interest can be identified in a variety of different manners in accordance with different implementations.

In particular, in some embodiments a user can identify regions of interest to designate as a main object (e.g., by selecting one or more objects in a video). Such identifications can take place using any manner of interactions to select an object with a user interface (e.g., tapping, clicking, circling, etc.). For example, if a video shows a person throwing a Frisbee to a dog, a user could select the person, the Frisbee, and the dog as regions of interest to identify in frames as main objects. Upon a user identifying a region of interest in a frame, any manner of real-time object detection methods can be used to identify the main object in the frames being analyzed from the video clips that comprise the scene being analyzed. In this way, the region of interest can be propagated across any additional frames being analyzed for identifying the main object (e.g., frames from video clips that comprise the scene being analyzed).

In further embodiments, fully automatic object detection can be used to identify main objects. For instance, real-time object detection methods can be used to identify the main object in the frames being analyzed from the video clips that comprise the scene being analyzed. In particular, any number of trained neural networks can be used for main object detection (e.g., YOLO or SDD). In one embodiment, a neural network can analyze a frame by dividing the still image of the frame into a grid and then generating bounding boxes that identify objects in the frame. The neural network can also generate predicted probabilities for the regions in the bounding boxes (e.g., that indicated the likelihood that the object in the bounding box is correctly identified). For instance, a bounding box in a frame can surround a bicycle in the frame and the predicted probability that the object in the bounding box is the bicycle can be 90%.

At block 408, features associated with main object(s) in a frame can be determined. Features can comprise objects, aspects, and/or characteristics associated with the main object. For example, features can be colors, materials, and/or object associated with a main object. Based on a main object identified in the frame, the frame can be cropped to identify an area related to the main object. This smaller area can then be analyzed for features associated with the main object. Advantageously, identifying a smaller area of the frame can allow for a more detailed analysis of associated features while utilizing less computational resources.

Features can be determined using various methods. In implementations, a feature for a main object in a frame can be identified using automatic identification based on feature detection technologies (e.g., one or more trained CNNs). For instance, a set of trained deep learning image recognition algorithms (e.g., CNNs) can be used to detect features. In embodiments, identified features can have associated prediction confidence levels (e.g., indicating probability of correct identification).

Further, in some implementations, a feature can be identified in associated with a main object based on a selection by a user. Such a selection by a user can indicate a level of features to analyze in association with the main object. As an example, a user can indicate only one level of features should be analyzed or two levels of features should be analyzed. As an example, one level of feature determination for a person (e.g., main object) can identify associated features: red plaid shirt, water bottle, and glasses; two levels of feature determination for the person can be that the water bottle has a further associated feature: green label and the glasses have a further associated feature: blue color.

At block 410, feature representation(s) can be generated. A feature representation can be generated for each main object in a frame. Such a feature representation can be in the form of a feature tree. A feature tree can indicate the hierarchical relationship between a main object and associated features. For instance, the amount of levels in such a hierarchical relationship between the main object and associated features can be based on a level of analyzed features for the main object.

At block 412, a determination is made as to whether there are more frames in the video to be analyzed. When analyzing for continuity errors in a scene based on visual inconsistency between video clips that make up a scene, the frames bordering transitions in the scene can be analyzed. For instance, a first frame from a first video clip (e.g., the video clip being exited in the transition) can be selected along with a second frame from a second video clip (e.g., the video clip being entered in the transition). In some instances, multiple frames from the first video clip and multiple frames second video clip can be analyzed. If the result of the determination at block 412 is that there are more frames to analyze then processing returns to block 406. If the result of the determination at block 412 is that there are not more frames to analyze then processing continues to block 414.

At block 414, frames can be compared. Frames can be compared using the generated feature representations associated with the analyzed frames. As an example, in a first video clip of a scene, a main character is wearing a blue plaid shirt and in a second video clip of the scene, the main character is wearing a red plaid shirt. A first feature representation from the first video clip of the scene (e.g., main character: blue plaid shirt) can be compared with a second feature representation from the second video clip of the scene (e.g., main character: red plaid shirt). At block 416, these comparisons can be used to determine visual inconsistencies. In particular, visual inconsistencies can be determined using the compared frames (e.g., based on feature representations). For instance, based on the comparison between the first feature representation and the second feature representation, an inconsistency between the main character in the first video clip of the scene and the second video clip of the scene can be determined. Such a visual inconsistencies can be identified as a continuity error.

At block 418, an error report can be generated that indicates any continuity errors (e.g., based on visual inconsistencies) identified in the video. The error report can present identified continuity errors in a variety of manners, as previously discussed with reference to FIG. 3.

Figure 5:
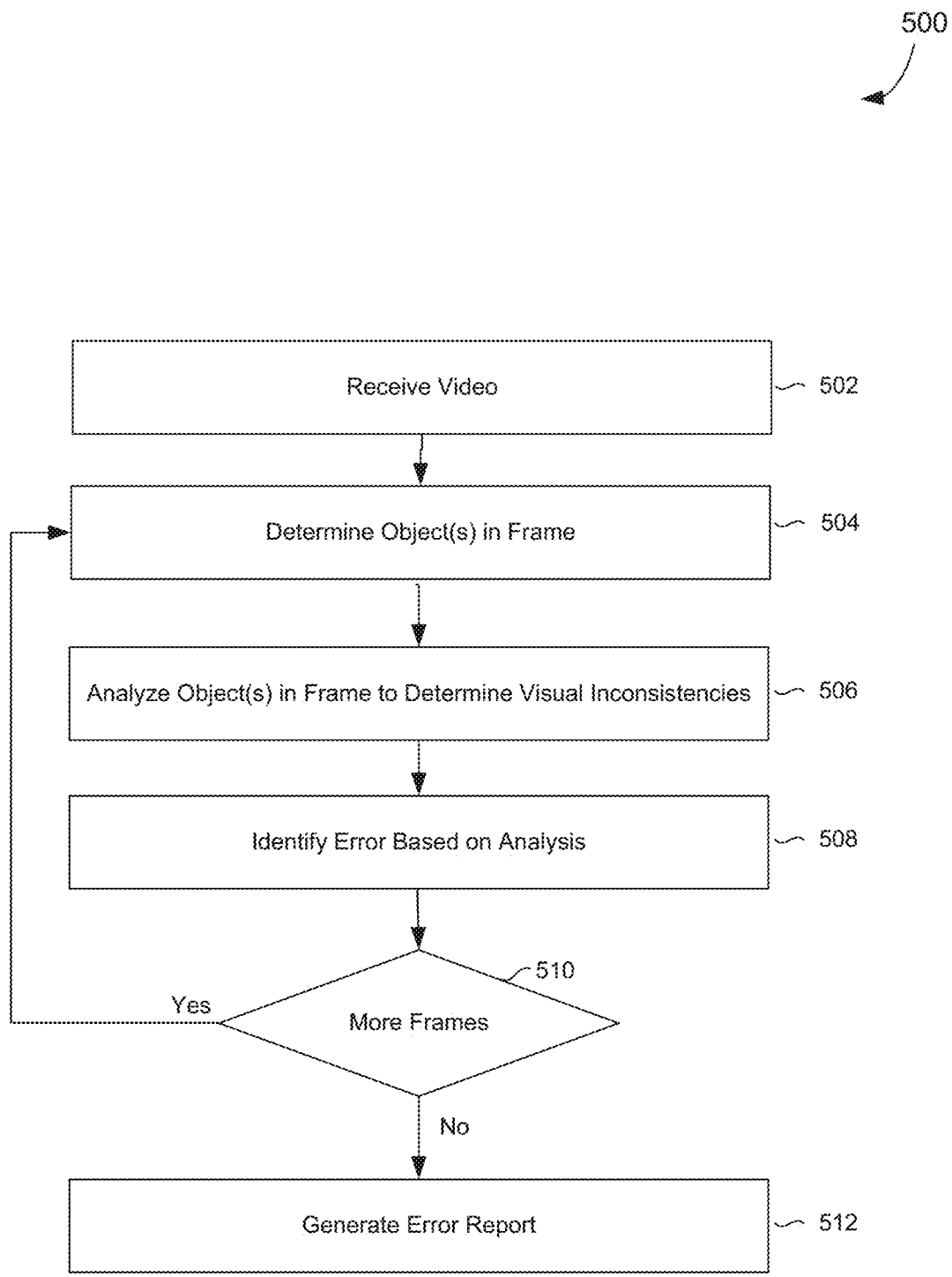
FIG. 5 depicts a process flow showing an embodiment of generating an error report indicating continuity errors based on identified visual inconsistencies related to semantic analysis of a video, in accordance with various embodiments of the present disclosure.

FIG. 5 provides a process flow showing an embodiment of method 500 depicting an example of generating an error report indicating continuity errors based on identified visual inconsistencies related to semantic analysis of a video, in accordance with various embodiments of the present disclosure. Such a method can take place using the frame analysis engine 206 in conjunction with semantics engine 210 of continuity detection system 204 as described with reference to FIG. 2.

At block 502, a video is received. The video can be comprised of N frames. Such a video can be received from, for example, a data store and/or from a database stored in the cloud. At block 504, objects in a frame can be determined. In embodiments, the objects can be main objects. Such main objects can be determined using various methods, such as those discussed previously with reference to FIGS. 3 and 4.

In some embodiments, features associated with objects (e.g., main objects) can be identified. Such associated features can be determined using various methods, such as those as discussed previously with reference to FIGS. 3 and 4.

At block 506, the objects in the frame can be analyzed. In particular, the objects, in the frame can be analyzed based on semantic consistency with the video. In some embodiments, the semantics of the video or a scene in the video can be identified (e.g., by a user). Based on the semantics, the objects in the frame can be analyzed. For instance, a trained model can be used to perform such an analysis. In particular, the trained model can be a dynamically updatable learning model (e.g., trained based on the semantics). Such a model can be a cloud-based model that can be updated using identified errors in detection (e.g., based on incorrectly flagged semantic continuity errors). As an example, a car identified in a scene with medieval semantics can be flagged as a visual inconsistency. As another example, a STARBUCKS coffee cup identified in a scene with medieval fantasy semantics can be flagged as a visual inconsistency.

At block 508, the analysis can be used to identify continuity errors. In particular, a continuity error can be identified when an object (e.g., main object and/or feature) does not fit with the semantics (e.g., identified as a visual inconsistency). In particular, continuity errors can be identified using the determined visual inconsistencies based on the semantic analysis.

At block 510, a determination is made as to whether there are more frames in the video to be analyzed. When analyzing for continuity errors based on visual inconsistencies from semantics of the video or a scene in the video, the entire video or the scene can be analyzed. In some instances, to save on computational resources, select frames from the entire video or scene can be analyzed (e.g., every tenth frame, ten frames per minute of film, etc.). Such select frames can be indicated, for example, by a user. If the result of the determination at block 510 is that there are more frames to analyze then processing returns to block 504. If the result of the determination at block 510 is that there are not more frames to analyze then processing continues to block 512.

At block 512, an error report can be generated that indicates any continuity errors (e.g., based on visual inconsistencies) identified in the video. The error report can present identified continuity errors in a variety of manners, for example, as previously discussed with reference to FIG. 3.

Figure 6:
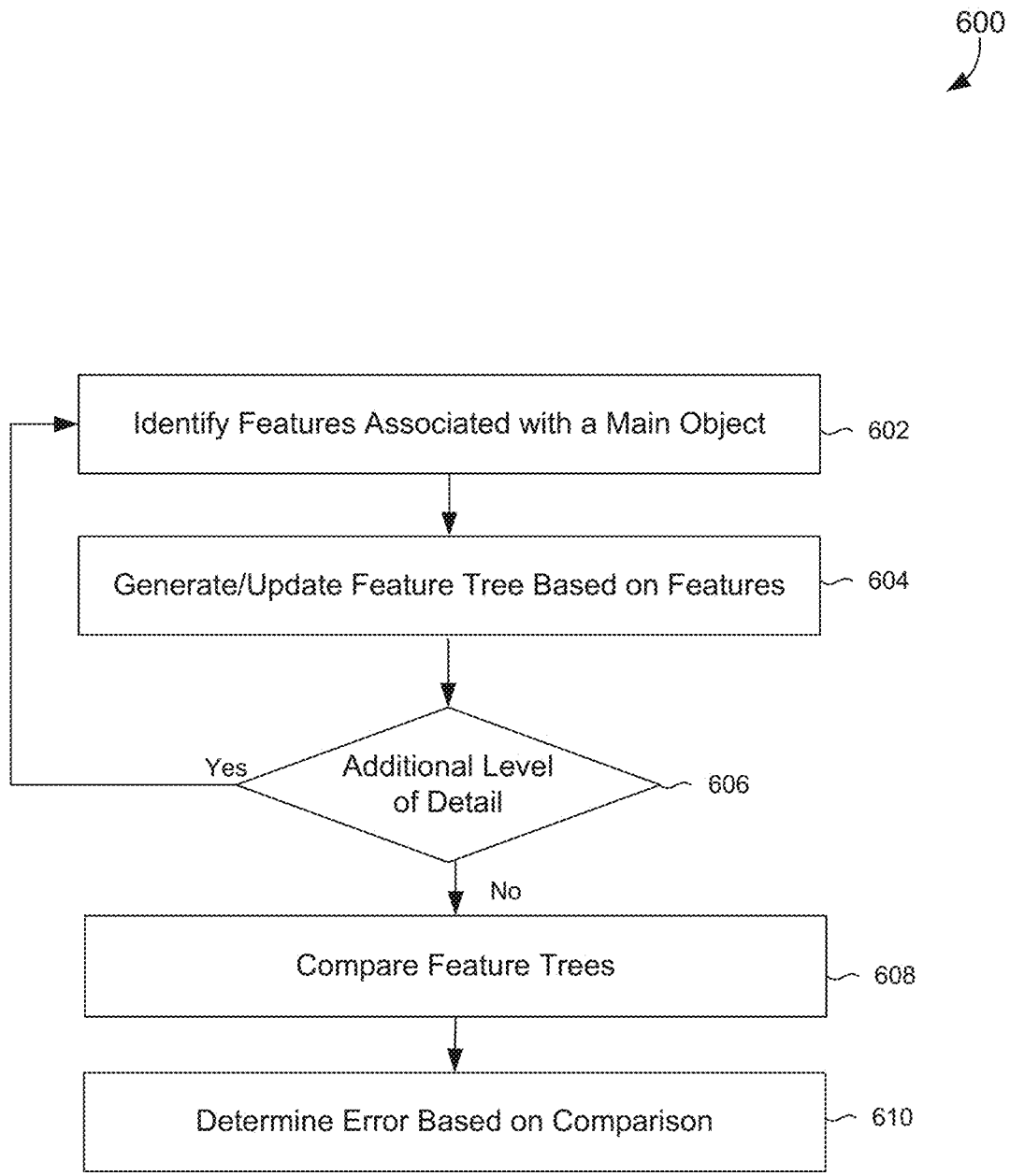
FIG. 6 depicts a process flow showing an embodiment of analyzing features in frames of a video for continuity error, in accordance with various embodiments of the present disclosure.

FIG. 6 provides a process flow showing an embodiment of method 600 depicting an example of analyzing features in frames of a video for continuity error, in accordance with various embodiments of the present disclosure. Such analysis can be performed, for instance, using continuity detection engine 204 as described with reference to FIG. 2.

At block 602, features associated with a main object can be identified. Features can comprise objects, aspects, and/or characteristics associated with the main object. A main object can comprise an area of a frame that contains meaningful content and/or contains subject matter of the frame. Meaningful content can be designated as content in a video frame of interest to a user. For example, meaningful content can be the main person and/or object in the video frame. The features associated with the main object can be identified using, for example, automatic identification using feature detection technologies (e.g., one or more trained CNNs). For instance, a set of trained deep learning image recognition algorithms (e.g., CNNs) can be used to detect features. In embodiments, identified features can have associated prediction confidence levels (e.g., indicating probability of correct identification).

At block 604, a feature tree can be generated and/or updated. Such a feature tree (e.g., feature representation) can be generated for each main object in a frame of a video based on the identified associated features. For instance, a feature tree can indicate the hierarchical relationship between a main object and associated features. For instance, the amount of levels in such a hierarchical relationship between the main object and associated features can be based on a level of analyzed features for the main object. As an example, one level of feature determination for a person (e.g., main object) can identify associated features: red plaid shirt, water bottle, and glasses; two levels of feature determination for the person can be that the water bottle has a further associated feature: green label and the glasses have a further associated feature: blue color.

At block 606, a determination can be made whether there should be an additional level of detail analyzed. The level of detail can be indicated, for example, by a user. Such a level of detail can indicate a level of features to analyze in association with the main object. As an example, only one level of features can be analyzed or two (or more) levels of features can be analyzed. If the result of the determination at block 606 is that there is an additional level of detail to analyze then processing returns to block 602. If the result of the determination at block 606 is that there is not an additional level of detail to analyze then processing continues to block 608.

At block 608, feature trees can be compared. In particular, main objects for each frame can be compared to determine whether one or more of the main objects appears or disappears in one frame as compared to another frame. Further, features associated with the main objects for each frame can be compared to determine whether one or more of the features appears or disappears in one frame as compared to another frame. A feature tree can indicate the hierarchical relationship between a main object and associated features. As such, to compare the feature trees, branches associated with main objects can be compared between two (or more) frames to identify any differences. As an example, if a main object is "man" and one frame has a branch with "red plaid shirt," "glasses," and "hat," and another frame has a branch with "green shirt" and "hat" then visual inconsistencies can be determined between the disappearance of "red plaid shirt" and "glasses" and the appearance of "green shirt."

In some embodiments, comparing the feature trees can determine a feature weight indicating deviation between the feature trees. This feature weight can be determined using a variety of factors such as, for example, size and distance of a deviation to the main object.

At block 610, an error report can be generated that indicates any continuity errors (e.g., based on visual inconsistencies) identified in the video. The error report can present identified continuity errors in a variety of manners, for example, as previously discussed with reference to FIG. 3.

Figure 7:
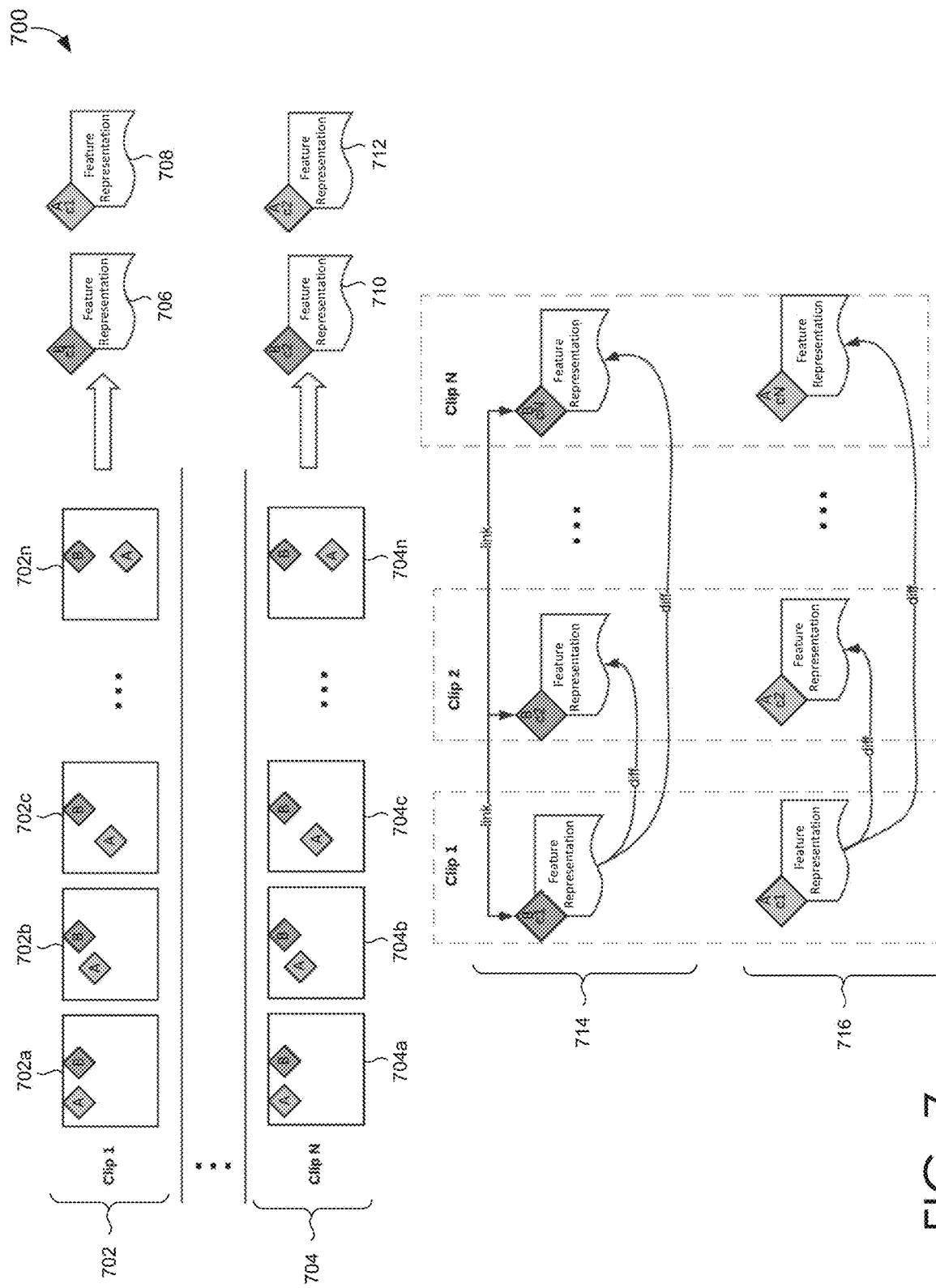
FIG. 7 illustrates an example of a continuity detection system identifying continuity errors based on determined visual inconsistencies between video clips that make up a scene in a video, in accordance with embodiments of the present disclosure.

FIG. 7 illustrates an example of continuity detection system 700 identifying continuity errors based on determined visual inconsistencies between video clips that make up a scene in a video, in accordance with embodiments of the present disclosure, such as those described above in connection with FIGS. 2-6. A video can be input into continuity detection system 700. Such a video can be received from, for example, a data store and/or from a database stored in the cloud. The video can be comprised of N frames. A scene of the video can be selected for analysis. As depicted, such a scene can be comprised of video clip 702 (e.g., a first video clip) to video clip 704 (e.g., n video clip). Video clip 702 can be comprised of video frame 702a, video frame 702b, video frame 702c, . . . , and video frame 702n. Video clip 704 can be comprised of video frame 704a, video frame 704b, video frame 704c, . . . , and video frame 704n.

Continuity detection system 700 can analyze frames of the video clips to identify any visual inconsistencies between the video clips. Initially, the frames can be analyzed to determine main objects. As depicted, the frames can have main object A and main object B. Main objects can be determined using methods as previously discussed, for example, with reference to FIGS. 2-4. For each video clip (e.g., video clip 702 to video clip 704), main object A and main object B can also be analyzed to determine associated features. Features can comprise objects, aspects, and/or characteristics associated with the main object. For example, features can be colors, materials, and/or objects associated with a main object. Associated features can be determined using methods as previously discussed, for example, with reference to FIGS. 2-4. Upon identifying associated features for video clip 702, feature representation 706 (e.g., for main object B) and feature representation 708 (e.g., for main object A) can be generated. Further, upon identifying associated features for video clip 704, feature representation 710 (e.g., for main object B) and feature representation 712 (e.g., for main object A) can be generated. Such a feature representation can be in the form of a feature tree. A feature tree can indicate the hierarchical relationship between a main object and associated features.

Continuity analysis 714 can be performed to compare the feature representations associated with main object B across the video clips (e.g., as depicted: clip 1, clip 2, . . . , and clip N). Continuity analysis 716 can be performed to compare the feature representations associated with main object A across the video clips (e.g., as depicted: clip 1, clip 2, . . . , and clip N). Comparing such feature representations for each of the main objects can be used to detect any visual inconsistencies between the video clips. For instance, comparing the feature representations can identify an appearance or disappearance of a particular associated feature in one or more of the video clips.

Figure 8:
FIG. 8 illustrates an example of a continuity detection system identifying continuity errors based on determined visual inconsistencies between video clips that make up a scene in a video, in accordance with embodiments of the present disclosure.

FIG. 8 illustrates an example of a continuity detection system 800 identifying continuity errors based on determined visual inconsistencies between video clips that make up a scene in a video, in accordance with embodiments of the present disclosure. In particular, FIG. 8 depicts video frame 802 (e.g., from a first video clip of a scene in a video) and video frame 804 (e.g., from a second video clip of the scene in the video). As a non-limiting example, video frame 802 can be the last frame of a first video clip of a scene in a video and video frame 804 can be the first frame of a second video clip of the scene in the video. Video frame 802 and video frame 804 can be analyzed to identify main objects and associated features in the frames. As depicted, video frame 802 has person 806 (e.g., a first main object) with associated features: desk 808 (e.g., a first associated feature) and glass 810 (e.g., a second associated feature). Further, as depicted, video frame 804 has person 812 (e.g., a first main object) with associated features: desk 814 (e.g., a first associated feature), glass 816 (e.g., a second associated feature), and bottle 818 (e.g., a third associated feature).

The main object(s) and associated features can be used to generate feature representations associated with video frame 802 and video frame 804. For example, video frame 802 can have a feature representation: a person—table and glass and video frame 804 can have a feature representation: a person—table, glass, and bottle. These feature representations can be compared to identify any visual inconsistencies between video clip 802 and video clip 804. For instance, comparing the feature representations for video clip 802 and video clip 804 indicates that bottle 818 is not present in video clip 802. Such an inconsistency can be identified as a continuity error. In some embodiments, continuity errors can be included in an error report. One example of an error report is presenting video clip 802 and video clip 804 as depicted except that the bounding box associated with bottle 818 is in red to indicate a continuity error. Another example of an error report is presenting the feature representations associated with video clip 802 and video clip 804 and indicating that bottle 818 has been identified as a continuity error.

Figure 9:
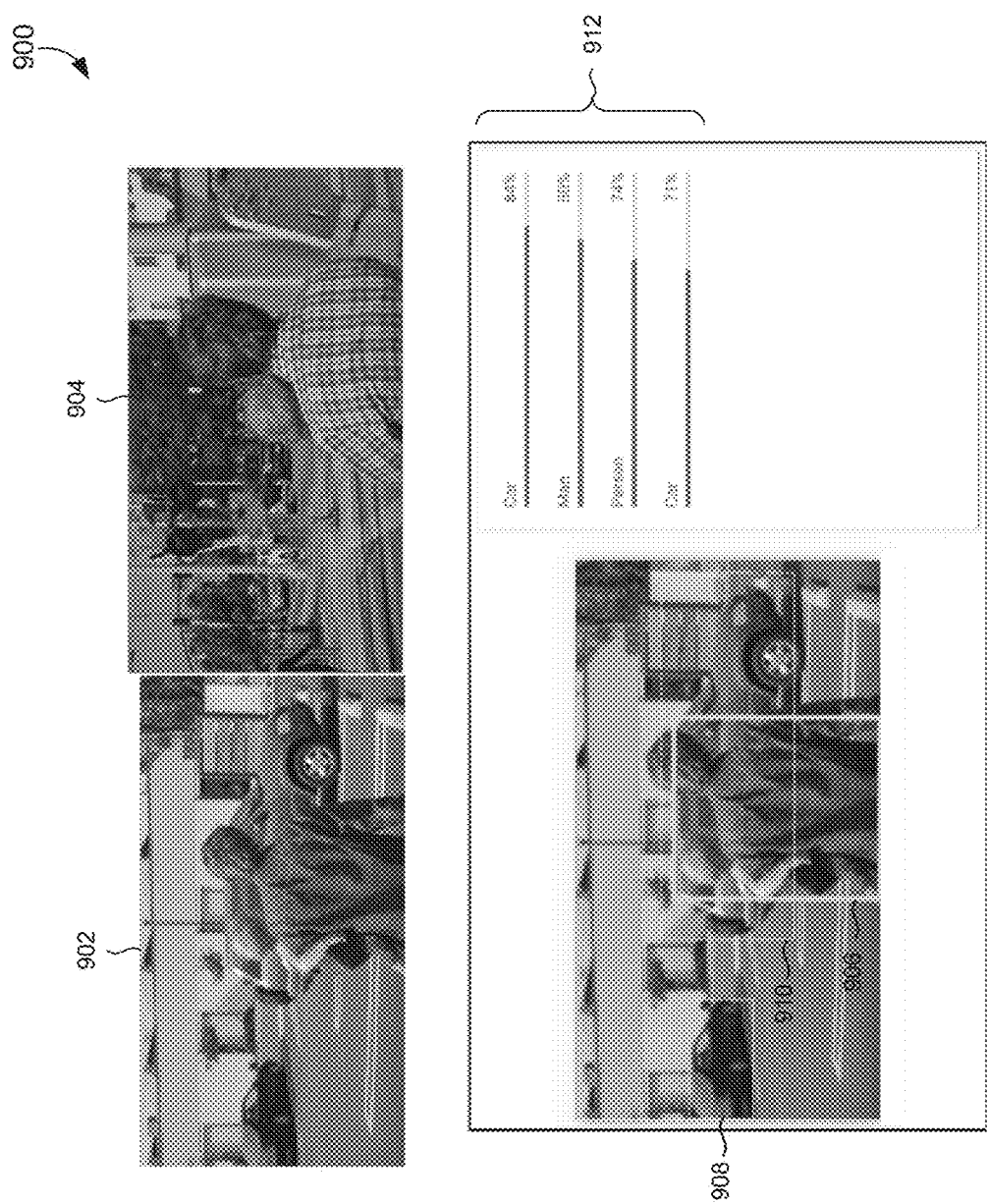
FIG. 9 illustrates an example of a continuity detection system identifying continuity errors based on determined visual inconsistencies between video clips that make up a scene in a video, in accordance with embodiments of the present disclosure.

FIG. 9 illustrates an example of a continuity detection system 900 identifying continuity errors based on determined visual inconsistencies between video clips that make up a scene in a video, in accordance with embodiments of the present disclosure. In particular, FIG. 9 depicts video frame 902 (e.g., from a first video clip of a scene in a video) and video frame 904 (e.g., from a second video clip of the scene in the video). As a non-limiting example, video frame 902 can be the last frame of a first video clip of a scene in a video and video frame 904 can be the first frame of a second video clip of the scene in the video.

Video frame 902 can be analyzed to identify main objects and associated features in the frame. As depicted, video frame 902 has man 906, car 908, and car 910. In one embodiment, man 906, car 908, and car 910 can all be identified as main objects in video frame 902 (e.g., determined using methods as previously discussed, for example, with reference to FIGS. 2-4). Associated prediction confidence levels 912 can be determined along with the identified main objects in video frame 902. Prediction confidence levels 912 can indicate the probability of correct identification of an object. As depicted, continuity detection system 900 is 84% confident that car 908 is a car, 80% confident that man 906 is a man, and 71% confident that car 910 is a car. In another embodiment, man 906 can be identified as a main object in video frame 902. For instance, appearance time of man 906 frame-to-frame in a scene can be used to distinguish man 906 as a main object as opposed to a background object (e.g., car 908 and car 910).

Man 906 can be further analyzed to identify associated features. Such associated features can include colors, material, and/or objects that are associated with man 906. For example, features associated with man 906 can include: child and blue jacket. Additional levels of features can also be identified. Such a level of detail can be indicated, for example, by a user. The level of detail can indicate a level of features to analyze in association with the main object. As an example, if two levels of features for analysis are indicated for video frame 902, a second level of features can be for the child (e.g., associated feature: blue shirt).

Video frame 904 can also be analyzed to identify main objects and associated features in the frame. For example, while not depicted, main object in video frame 904 can be the man with associated feature: plaid shirt. The main object(s) and associated features identified for video frame 902 and video frame 904 can be used to generate associated feature representations for each video frame. Such feature representations can be in the form of feature trees. A feature tree can indicate the hierarchical relationship between a main object and associated features. The feature representations for video frame 902 and video frame 904 can be compared to detect any visual inconsistencies between the video frames. For instance, the change in an associated feature (e.g., blue jacket) for video frame 902 with an associated feature (e.g., plaid shirt) for video frame 904 can be identified as a continuity error. In embodiments, continuity errors can be presented using an error report.

Figure 10:
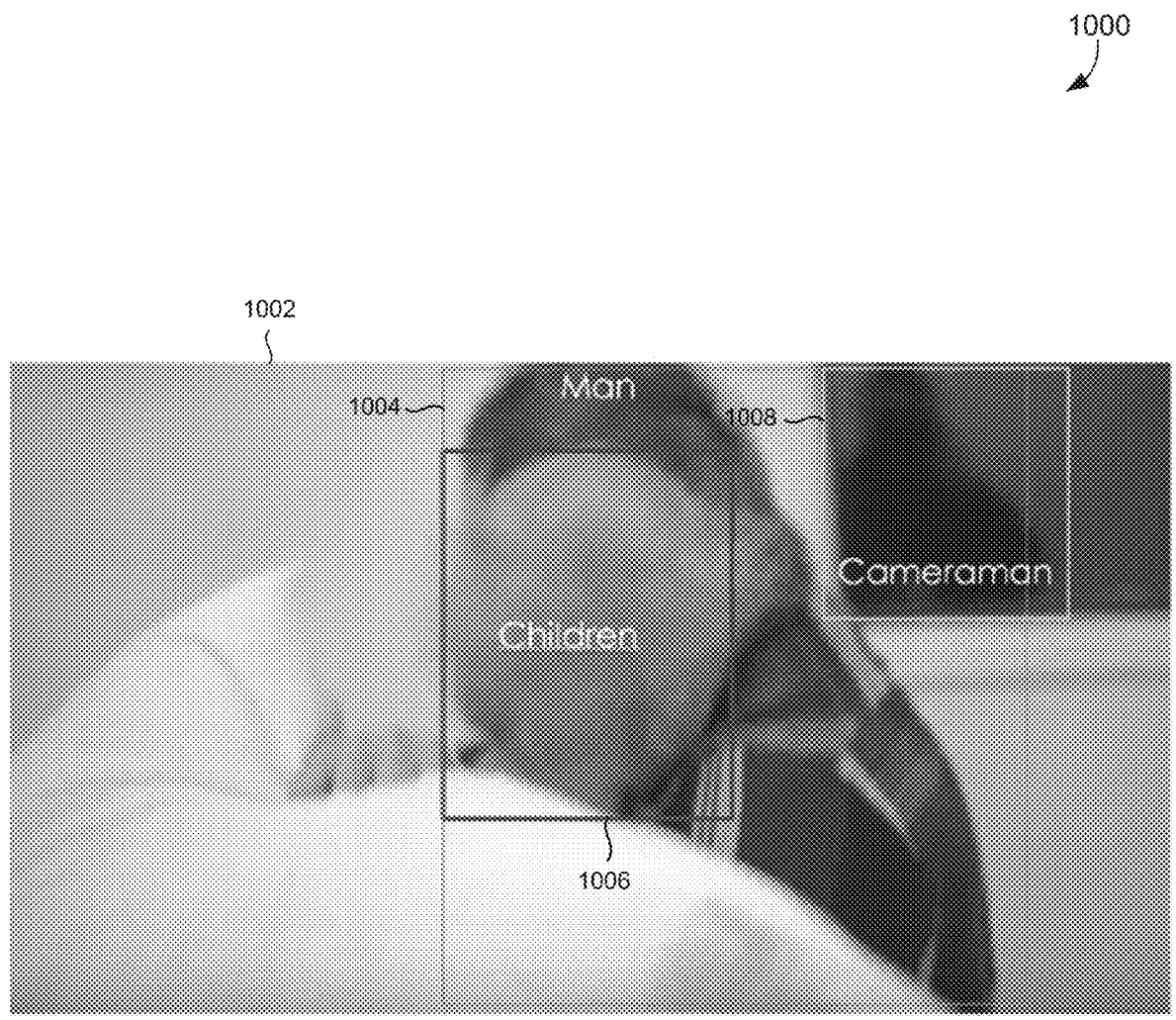
FIG. 10 depicts an example of a continuity detection system identifying continuity errors based on determined visual inconsistencies in a video, in accordance with embodiments of the present disclosure.

FIG. 10 illustrates an example of a continuity detection system 1000 identifying continuity errors based on determined visual inconsistencies in a video, in accordance with embodiments of the present disclosure. In particular, FIG. 10 depicts video frame 1002 (e.g., from a video clip of a scene in a video). Video frame 1002 can be analyzed to identify objects in the frame (e.g. main objects and associated features). As depicted, video frame 1002 has objects including man 1004, children 1006, and cameraman 1008. The identified objects in video frame 1002 can be analyzed based on semantic consistency with the video.

In some embodiments, the semantics of the video or a scene in the video can be identified (e.g., by a user). Based on the semantics, the objects in the frame can be analyzed. For instance, a trained model can be used to perform such an analysis. In particular, the trained model can be a dynamically updatable learning model (e.g., trained based on the semantics). Such a model can be a cloud-based model that can be updated using identified errors in detection (e.g., based on incorrectly flagged semantic continuity errors). A continuity error can be identified when an object (e.g., main object and/or feature) does not fit with the semantics of the scene or video. As an example, a camera operator identified in a scene can always be identified to be a continuity error (e.g., no matter the semantics of the scene and/or video).

Figure 11:
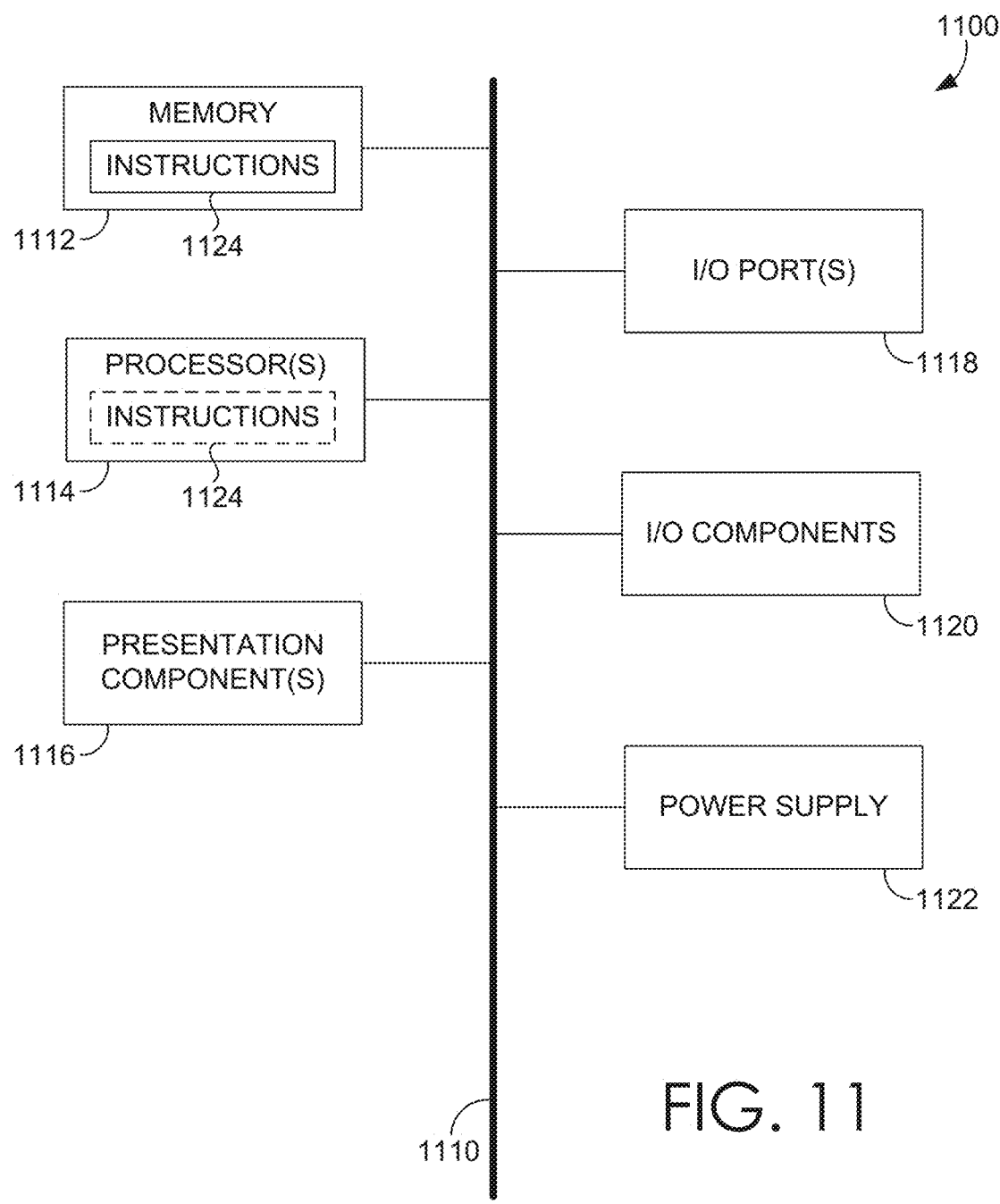
FIG. 11 is a block diagram of an example computing device in which embodiments of the present disclosure may be employed.

Having described embodiments of the present invention, an example operating environment in which embodiments of the present invention may be implemented is described below in order to provide a general context for various aspects of the present invention. Referring to FIG. 11, an illustrative operating environment for implementing embodiments of the present invention is shown and designated generally as computing device 1100. Computing device 1100 is but one example of a suitable computing environment and is not intended to suggest any limitation as to the scope of use or functionality of the invention. Neither should the computing device 1100 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a smartphone or other handheld device. Generally, program modules, or engines, including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialized computing devices, etc. Embodiments of the invention may also be practiced in distributed computing environments where tasks are performed by remote-processing devices that are linked through a communications network.

With reference to FIG. 11, computing device 1100 includes a bus 1110 that directly or indirectly couples the following devices: memory 1112, one or more processors 1114, one or more presentation components 1116, input/output ports 1118, input/output components 1120, and an illustrative power supply 1122. Bus 1110 represents what may be one or more busses (such as an address bus, data bus, or combination thereof). Although the various blocks of FIG. 11 are shown with clearly delineated lines for the sake of clarity, in reality, such delineations are not so clear and these lines may overlap. For example, one may consider a presentation component such as a display device to be an I/O component, as well. Also, processors generally have memory in the form of cache. We recognize that such is the nature of the art, and reiterate that the diagram of FIG. 11 is merely illustrative of an example computing device that can be used in connection with one or more embodiments of the present disclosure. Distinction is not made between such categories as "workstation," "server," "laptop," "hand-held device," etc., as all are contemplated within the scope of FIG. 11 and reference to "computing device."

Computing device 1100 typically includes a variety of non-transitory computer-readable media. Non-transitory Computer-readable media can be any available media that can be accessed by computing device 1100 and includes both volatile and nonvolatile media, removable and non-removable media. By way of example, and not limitation, non-transitory computer-readable media may comprise non-transitory computer storage media and communication media.

Non-transitory computer storage media include volatile and nonvolatile, removable and non-removable media implemented in any method or technology for storage of information such as computer-readable instructions, data structures, program modules or other data. Non-transitory computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1100. Non-transitory computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1112 includes computer storage media in the form of volatile and/or nonvolatile memory. As depicted, memory 1112 includes instructions 1124. Instructions 1124, when executed by processor(s) 1114 are configured to cause the computing device to perform any of the operations described herein, in reference to the above discussed figures, or to implement any program modules described herein. The memory may be removable, non-removable, or a combination thereof. Illustrative hardware devices include solid-state memory, hard drives, optical-disc drives, etc. Computing device 1100 includes one or more processors that read data from various entities such as memory 1112 or I/O components 1120. Presentation component(s) 1116 present data indications to a user or other device. Illustrative presentation components include a display device, speaker, printing component, vibrating component, etc.

I/O ports 1118 allow computing device 1100 to be logically coupled to other devices including I/O components 1120, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A computer-implemented method, comprising:
generating a first feature representation, comprising a first feature tree indicating a hierarchical relationship between one or more first objects and a plurality of associated features, for a first frame of a video, wherein the first feature representation corresponds to the first frame of the video;
generating a second feature representation, comprising a second feature tree for a second frame of the video, wherein the second feature representation is generated based on one or more second objects corresponding to the second frame of the video;
comparing the first feature representation and the second feature representation to determine a feature weight indicating a deviation between the first feature tree and the second feature tree;
determining one or more visual inconsistencies between the first frame and the second frame based on the deviation;
based on a first determined visual inconsistency of the one or more visual inconsistencies, identifying a continuity error for the video; and
generating an error report that indicates the continuity error.

2. The computer-implemented method of claim 1, wherein the one or more first objects includes a main object, the method further comprising:
identifying a main object of the one or more first objects corresponding to the first frame of the video;
cropping the first frame of the video to identify an area related to the main object to analyze one or more features of the plurality of features associated with the main object; and
identifying the one or more features associated with the main object based on the area related to the main object, wherein the main object and the one or more features comprise the one or more first objects corresponding to the first frame of the video.

3. The computer-implemented method of claim 2, further comprising:
based on an indicated level of features to analyze, identifying one or more additional features of the plurality of associated features.

4. The computer-implemented method of claim 2, further comprising:
using a real-time object detection neural network to identify the main object and using one or more deep learning image recognition convolutional neural networks to identify the one or more features for the main object.

5. The computer-implemented method of claim 1, wherein the main object comprises a person.

6. The computer-implemented method of claim 1, wherein the determined visual inconsistency is based on an appearance of the at least one object, wherein an appearance time of the at least one object is used to determine a type of the at least one object.

7. The computer-implemented method of claim 1, wherein the first frame is a last frame of a first video clip of a scene and the second frame is an initial frame of a second video clip of the scene.

8. The computer-implemented method of claim 1, wherein the error report highlights the continuity error using a colored bounding box around the at least one object corresponding to the determined visual inconsistency.

9. The computer-implemented method of claim 1, wherein the error report includes predicted probabilities for the one or more first objects that indicate a likelihood that the one or more objects are correctly identified.

10. One or more computer storage media storing computer-useable instructions that, when used by one or more computing devices, cause the one or more computing devices to perform operations comprising:
identifying one or more first objects corresponding to a first frame of a video;
generating a first feature representation, comprising a first feature tree indicating a hierarchical relationship between the one or more first objects and a plurality of associated features, for the first frame of a video, wherein the first feature representation corresponds to the first frame of the video;
generating a second feature representation, comprising a second feature tree, for a second frame of the video, wherein the second feature representation is generated based on one or more second objects corresponding to the second frame of the video;
comparing the first feature representation and the second feature representation to determine a feature weight indicating a deviation between the first feature tree and the second feature tree;
analyzing the one or more first and second objects to determine, based on the deviation, whether visual inconsistencies are present in the first frame;
based on a determined visual inconsistency, identifying a continuity error for the video; and
outputting an indication of the continuity error.

11. The one or more computer storage media of claim 10, wherein the determined visual inconsistency is based on a semantic analysis of an object of the one or more objects corresponding to the first frame of the video.

12. The one or more computer storage media of claim 11, wherein the semantic analysis is performed using a dynamically updatable learning model tailored to a semantic category related to the video.

13. The one or more computer storage media of claim 10, wherein the indication of the continuity error uses a colored bounding box around an object of the one or more objects corresponding to the determined visual inconsistency.

14. The one or more computer storage media of claim 10, the operations further comprising:
identifying one or more second objects corresponding to a second frame of the video; and
further analyzing the one or more objects in relation to the one or more second objects to determine whether the visual inconsistencies are present in the first frame or the second frame.

15. The one or more computer storage media of claim 10, wherein identifying the one or more objects further comprises:
identifying a main object of the one or more first objects corresponding to the first frame of the video;
cropping the first frame of the video to identify an area related to the main object to analyze one or more features of the plurality of associated features associated with the main object; and
identifying the one or more features associated with the main object based on the area related to the main object, wherein the main object and the one or more features comprise the one or more first objects corresponding to the first frame of the video.

16. The one or more computer storage media of claim 15, main object comprises a character.

17. The one or more computer storage media of claim 15, wherein an amount of levels in the hierarchical relationship between the one or more first objects and the plurality of associated features is based on a level of analyzed features for the one or more first objects.

18. A computing system comprising:
means for identifying one or more first items in a plurality of frames of a video;
generating a first feature representation, comprising a first feature tree indicating a hierarchical relationship between the one or more first items and a plurality of associated features, for the first frame of a video, wherein the first feature representation corresponds to the first frame of the video;
generating a second feature representation, comprising a second feature tree, for a second frame of the video, wherein the second feature representation is generated based on one or more second items corresponding to the second frame of the video;
comparing the first feature representation and the second feature representation to determine a feature weight indicating a deviation between the first feature tree and the second feature tree;
means for determining, based on the deviation, visual inconsistencies related to one or more objects in the plurality of frames of the video; and
means for indicating a continuity error for the video based on a determined visual inconsistency.

19. The computing system of claim 18, wherein determining the visual inconsistencies in the frames of the video is based on an appearance of at least one object of the one or more objects, and wherein an appearance time of the at least one object is used to determine a type of the at least one object.

20. The computing system of claim 18, wherein determining the visual inconsistencies in the frames of the video is based on a semantic analysis of at least one object of the one or more objects corresponding to a frame of the video.

* * * * *

UNITED STATES PATENT AND TRADEMARK OFFICE
CERTIFICATE OF CORRECTION

| | |
|---|---|
| PATENT NO. | : 11,423,654 B2 |
| APPLICATION NO. | : 16/589954 |
| DATED | : August 23, 2022 |
| INVENTOR(S) | : Tatiana Kosiakova and Nils Meder |

It is certified that error appears in the above-identified patent and that said Letters Patent is hereby corrected as shown below:

In the Claims

Claim 1, Column 23, Line 11:
The line reading "second feature tree for a second frame of the video," should read -- second feature tree, for a second frame of the video, --.

Claim 16, Column 24, Line 67:
The line reading "main object comprises a character." should read -- wherein the main object comprises a character. --.

Signed and Sealed this
Eighth Day of November, 2022

Katherine Kelly Vidal
*Director of the United States Patent and Trademark Office*